C. L. LIBBY.
TURRET LATHE.
APPLICATION FILED FEB. 6, 1908.
938,156.
Patented Oct. 26, 1909.
4 SHEETS—SHEET 3.
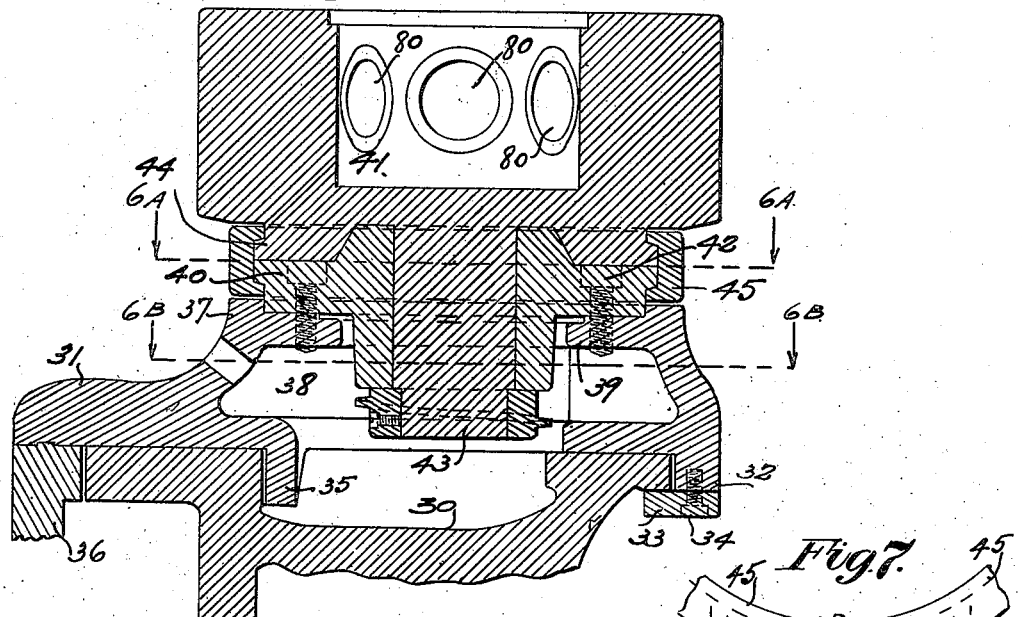
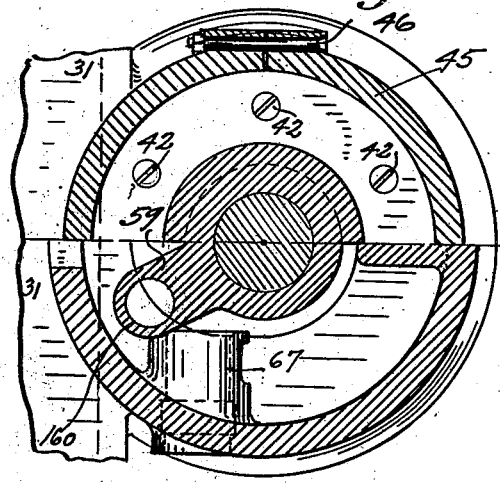
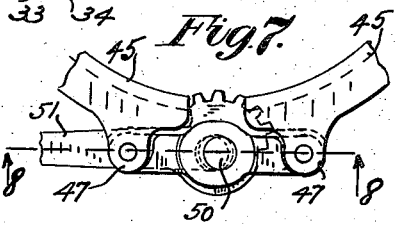
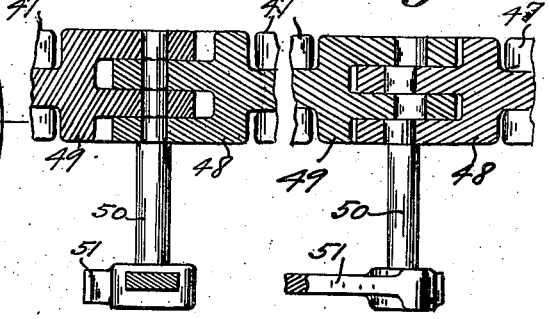
WITNESSES:
W. M. Gentle.
Olive Breeden
INVENTOR.
Charles L. Libby
BY
T. H. Lockwood.
ATTORNEY.

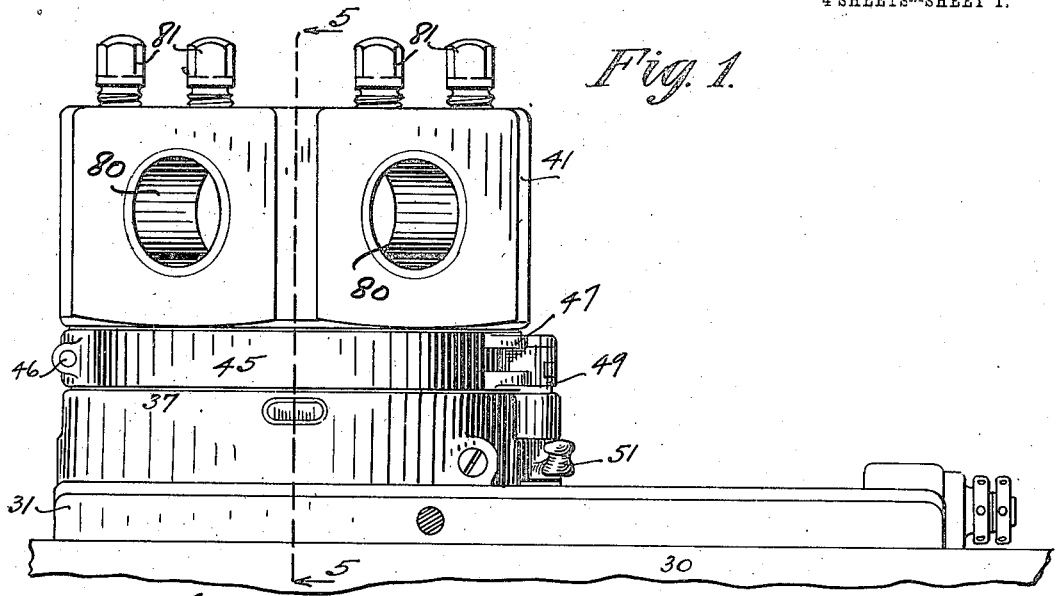

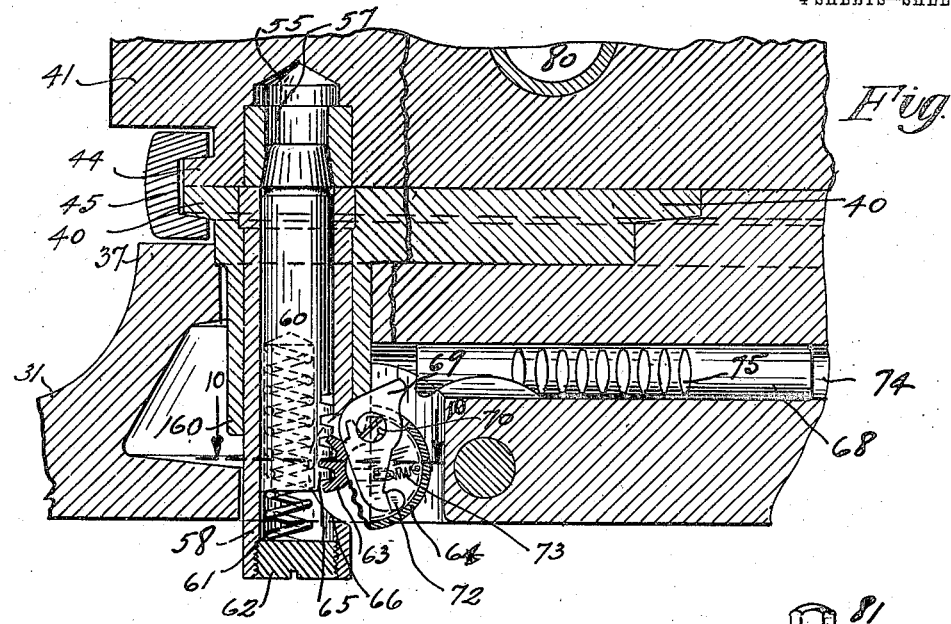
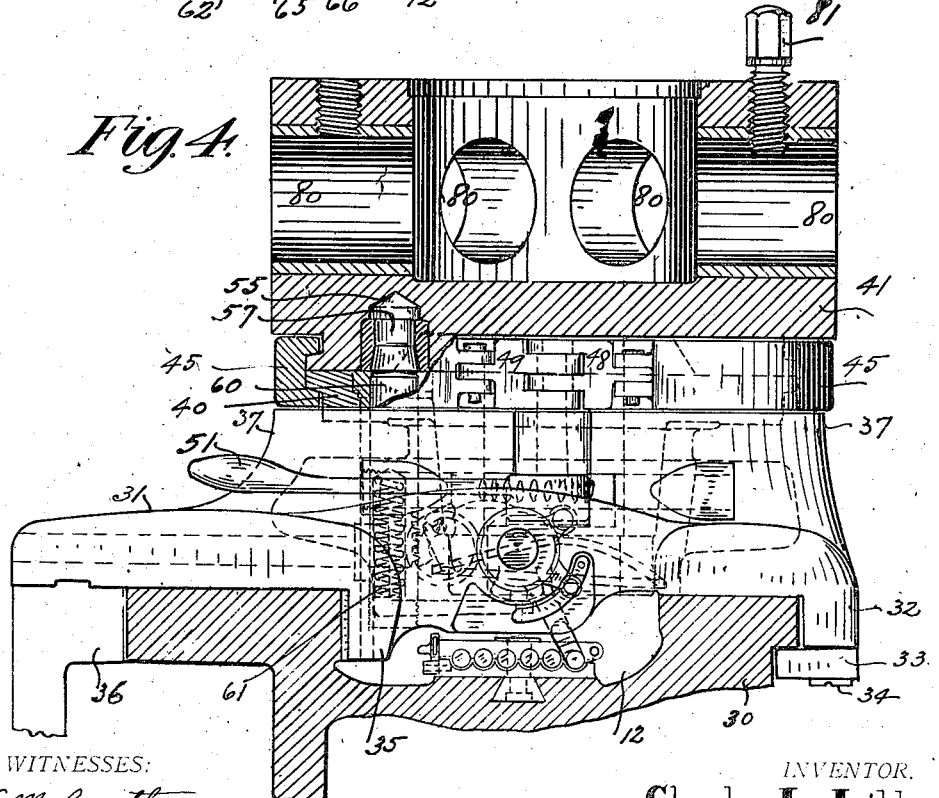

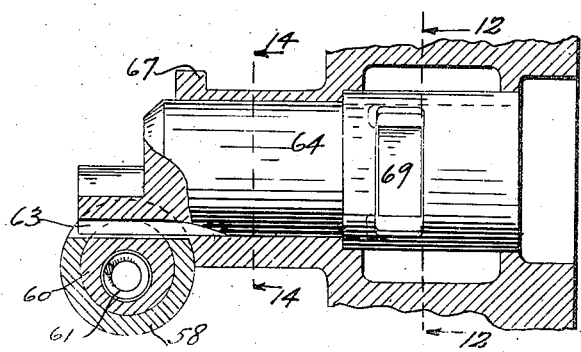
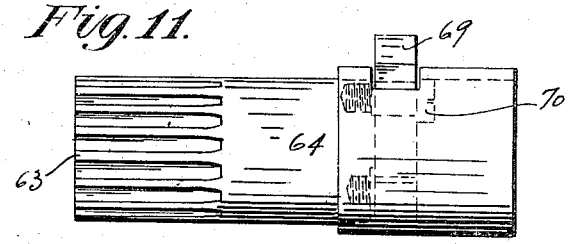
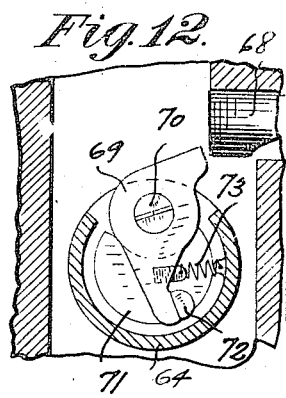
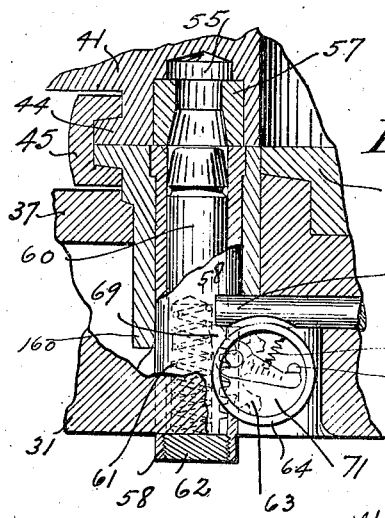
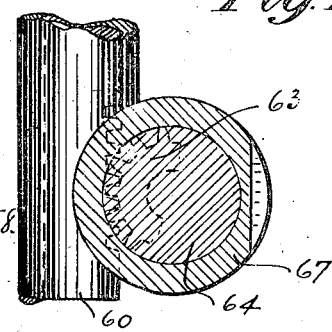
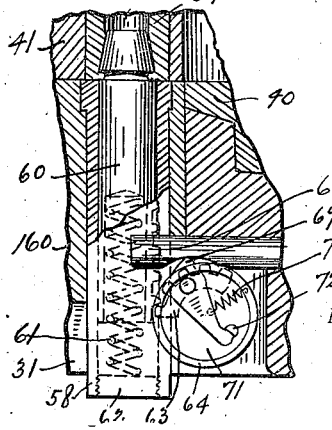

UNITED STATES PATENT OFFICE.

CHARLES L. LIBBY, OF INDIANAPOLIS, INDIANA.

TURRET-LATHE.

938,156.   Specification of Letters Patent.   Patented Oct. 26, 1909.

Application filed February 6, 1908. Serial No. 414,501.

*To all whom it may concern:*

Be it known that I, CHARLES L. LIBBY, of Indianapolis, county of Marion, and State of Indiana, have invented a certain new and useful Turret-Lathe; and I do hereby declare that the following is a full, clear, and exact description thereof, reference being had to the accompanying drawings, in which like numerals refer to like parts.

The object of this invention is to provide an improved construction of turrets for lathes, especially with relation to means for adjusting the position of the turret and for locking it in the adjusted position.

One feature of the invention consists in the provision of a vertical spring-actuated locking pin adapted to enter any one of a series of holes in the bottom of the turret for locking it in position, and an externally operable means for lowering and disengaging said locking pin while the turret is being turned to a new position. In this connection an externally operable lever is provided that engages a rack-bar or rod which moves a trip, and through it actuates a mutilated pinion that engages teeth on the locking pin for disengaging said locking pin from the turret.

Another feature of the invention consists in a clamping ring for clamping the turret in place to the stationary part upon which it is mounted. Said ring is a split ring with the two parts hinged at one side and enveloping the adjacent portions of the turret and the means on which it is mounted, and a cam rod for drawing the ends of said ring together.

Another feature of the invention consists in a single means, herein a lever, which simultaneously withdraws the locking pin from the turret and releases the clamping ring, so that the turret can be adjusted and which afterward tightens the clamping ring and simultaneously returns the means for disengaging the locking pin.

The full nature of this invention will be understood from the accompanying drawings and the following description and claims.

In the drawings Figure 1 is a side elevation of the turret and the upper part of the lathe bed, the remainder thereof being broken away. Fig. 2 is a view of what is shown in Fig. 1 partly in plan and partly in section to show the internal construction. Fig. 3 is a vertical section on the crooked line 3—3 of Fig. 2, the upper part of the turret being broken away and showing the turret locking pin in one of its locking positions. In Fig. 4 the upper part of the device is shown in vertical section on the line 4—4 of Fig. 2, while the central part of the device is shown in end elevation, and the lathe bed is in vertical section. Fig. 5 is a vertical transverse section on the line 5—5 of Fig. 1, omitting the feed indicator. The upper half of Fig. 6 is a horizontal section on the line 6ᴬ—6ᴬ and the lower half is a similar section on the line 6ᴮ—6ᴮ of Fig. 5. Fig. 7 is a detail view of the ends of the turret clamp and means for tightening it. Fig. 8 is a vertical section on the line 8—8 of Fig. 7. Fig. 9 is the same with the lever operated to loosen the clamp. Fig. 10 is a horizontal section on the line 10—10 of Fig. 3 showing the gear pin for actuating the locking pin. Fig. 11 is a side elevation of the gear pin shown in Fig. 10. Fig. 12 is a section of a portion of the device on the line 12—12 of Fig. 10. Fig. 13 shows the left hand half of what appears in Fig. 3 with the locking pin in its downmost disengaging position. Fig. 14 is a section on the line 14—14 of Fig. 10. Fig. 15 shows the lower part of Fig. 13 when the rack pin has reached its limit of movement.

In the machine shown herein for the purpose of illustrating the general nature of my invention, there is a lathe bed 30 upon which a turret base 31 rests so as to be slidable. The form and position of these parts are shown in Fig. 5, where the bed of the lathe is longitudinally and centrally recessed on its upper side and the turret base has a downwardly extending flange 32 along one side adjacent a lateral edge of the bed and the holding plate 33 is secured to the bottom of said flange by a screw 34, said plate holder projecting under the lateral edge of the bed, so that the turret base cannot be elevated without the removal of the bar 33. There is also a downwardly extending flange 35 projecting into the recess in the top of the lathe bed and beside one lateral wall of said recess. At the left hand, as shown in Fig. 5, the turret base projects laterally beyond the bed and an apron 36 is secured thereto and extends downwardly therefrom immediately beside a lateral edge of the bed. From the foregoing description and as shown in Fig. 5, it is seen that the base can have no lateral play on the lathe bed.

The turret base has an upward extension 37 from the body thereof at one end, as appears in Fig. 1, and that extension is provided with a central chamber 38, see Fig. 5, and there is an inwardly extending annular flange 39 from the upper part of said extension 37, upon which there is mounted a bearing ring 40 for the turret 41. The bearing ring 40 is secured by the screws 42, as here shown, but the parts 39 and 40 may be integral.

The turret has a central downwardly extending spindle 43 passing through the bearing ring 40, the body of the turret resting upon the upper surface of said bearing ring and having an annular projection 44 that fits about the central portion of the bearing ring, as shown in Fig. 5. Said part 44 of the turret has an annular external recess in it which leaves an annular rib along its lower edge. The bearing ring 40 has a corresponding annular rib along its upper edge and adjacent the annular rib on the lower end of the turret. The clamp ring 45 surrounds the upper part of the bearing ring 40, and the lower part 44 of the turret. The clamping ring 45 is made of two halves connected together at one side by the bolt 46, see Fig. 6, and at the other side opposite the location of the bolt 46 the ends of the clamp sections 45 are provided with ears 47 in which the eccentric straps 48 and 49 are pivoted, said straps being connected by an eccentric or crank shaft 50 vertically disposed, as shown in Figs. 8 and 9, and actuated by a hand lever 51 at the lower end of the shaft. When the hand lever is as shown in Figs. 7 and 8, the ends of the clamp ring are drawn together, and when the said lever is in the position shown in Fig. 9 the clamp ring is relaxed. When the clamp ring is relaxed the turret can be turned.

The turret has on its under side an annular series of holes 55 adapted to receive a locking pin 60. In each of said holes there is a bushing 57. There is one locking pin 60 by which the turret is held in any adjusted position. Said pin is mounted in a casing 58 that is secured in the boss 160 which extends downwardly from the bearing ring 40, see Figs. 3 and 6. The locking pin 60 is forced upwardly by the spring 61 which is partially embedded in said pin at one end and bears against the nut 62. The spring 61 forces said locking pin into its locking position. Said pin is withdrawn from its locking position by a mutilated segmental gear 63 on the gear pin 64, the teeth thereof meshing with a rack 65 on one side of the pin 60 near its lower end, as shown in Fig. 3. To enable these parts to mesh the casing 58 is cut away at 66 so that the gear pin may project through the casing into engagement with the locking pin. The gear pin 64 is mounted in a horizontal position in the horizontal bearing 67 from one side wall of the upper part of the turret base, see Fig. 6. Said gear pin 64 is actuated by a slidable rack pin 68, see Figs. 3 and 12, that engages the upper end of the trip 69 fulcrumed on the pin 70 in the end of a chamber 71 about midway of the gear pin 64, see Fig. 10. The lower end of the trip 69 engages a stop 72 and, therefore, when the rack pin 68 moves to the left, as shown in Fig. 12, it will, through the trip 69 oscillate the part 64 and the oscillation of the gear pin 64 will cause a downward withdrawing movement of the locking pin 60. The trip 69 is held against the stop 72 by a spring 73.

The gear pin 68 is slidable horizontally in a chamber 74 in the upper part of the turret base, see Fig. 3, the rack on said pin 68 being formed by notches 75 that mesh with the segmental gear on the end of the hand lever 51, as shown in Fig. 2. The same hand lever is on the eccentric shaft 50, wherefore, by the operation of the single hand lever the clamping ring 45 will be released at the same time that the locking pin 60 is moved into a downward disengaging position. This position of the pin 60 is shown in Fig. 13. Then the turret can be turned and adjusted. A further movement of the lever 51 causes the rack pin 68 to reach its inward limit of movement, as shown in Fig. 15 and in the latter part of this inward movement the point of the lower part of the inner end of the rack pin will disengage the upper end of the trip 69, so that the gear pin 68 will cease to hold the locking pin downward and when a hole 57 in the turret is in registry with the pin 60 it will be immediately forced upwardly by the spring 61 and such upward movement of the pin 60 will cause the partial rotation of the gear pin 63 and trip 69, the upper end of the trip 69 lying then in the recess 168 provided for it in the under side of the rack pin 68. Then when the lever 61 is moved to the left to its position shown in Fig. 2, the rack pin 68 will be withdrawn to its outer position as shown in Fig. 3, and as it is thus withdrawn the upper end of the trip 69 will disengage the pin 68 and said trip will be brought to its normal position by the spring 73. Since the locking pin 60 is thus released when the lever 51 is moved to its right hand limit, it is apparent that the clamping ring will be relaxed and the turret can readily be turned to the desired position and the locking pin will be free to move upwardly into the proper hole in the turret for proper holding the turret. Then, since the turret is thus positioned, the backward movement of the lever 51 to its normal position will clamp the clamping ring and secure the turret in its adjusted position to the part upon which it is mounted.

The turret has, corresponding with each of the six holes for the locking pin 60, a tool hole 80 and a set screw 81 projecting into said tool hole for clamping the tool in position.

What I claim as my invention and desire to secure by Letters Patent is:

1. A turret lathe including a turret provided on its under side with a series of holes, means on which said turret is revolubly mounted, a vertically movable locking pin mounted below said turret in position to engage any one of said holes and having a rack on one side thereof, a spring adapted to force said pin upwardly, a revoluble gear pin in position to engage the rack on said locking pin, a spring-held trip pivoted in said gear pin so as to actuate it, an externally mounted lever, and means actuated by said lever for engaging said trip and turning said gear pin so as to withdraw said locking pin from the turret, and then disengaging said trip to permit the return movement of the locking pin.

2. A turret lathe including a turret provided on its under side with a series of holes, means on which said turret is revolubly mounted, a vertically movable locking pin mounted below said turret in position to engage any one of said holes and having a rack on one side thereof, a spring adapted to force said pin upwardly, a revoluble gear pin in position to engage the rack on said locking pin, a spring-held trip pivoted in said gear pin, an externally mounted lever, and a sliding bar actuated by said lever that engages said trip for turning the gear pin and withdrawing said locking pin, said sliding bar being arranged to disengage said trip during the movement of the bar.

3. A turret lathe including a turret provided on its under side with a series of holes, means on which said turret is revolubly mounted, a vertically movable locking pin mounted below said turret in position to engage any one of said holes and having a rack on one side thereof, a spring adapted to force said pin upwardly, a revoluble gear pin in position to engage the rack on said locking pin, a spring-held trip pivoted in said gear pin, a sliding bar with its inner end adapted to engage said trip for turning the gear pin and withdrawing the locking pin as said bar is moved inwardly, said sliding bar being arranged so as to escape from the end of said trip before the inward limit of movement of the bar is reached to permit the locking pin to return to locking position, and external means for operating said rack bar.

4. A turret lathe including a turret provided on its under side with a series of holes, means on which said turret is revolubly mounted, a vertically movable locking pin mounted below said turret in position to engage any one of said holes and having a rack on one side thereof, a spring adapted to force said pin upwardly, a revoluble gear pin in position to engage the rack on said locking pin, a spring-held trip pivoted eccentrically in said gear pin, a stop on the gear pin that is normally engaged by said trip a sliding bar with its inner end adapted to actuate said trip for turning the gear pin and withdrawing the locking pin as said bar moves inwardly, said sliding bar being recessed near its inner end to permit said trip to escape from the bar before the bar has reached its inner limit of movement and thus permit the locking pin to move upwardly into locking position, and an externally mounted lever for operating said sliding bar.

5. A turret lathe including a turret with a series of holes on its under side, means on which said turret is revolubly mounted, a locking pin mounted below said turret in position to engage any one of the holes therein and having a rack on one side thereof, a spring adapted to force said pin upwardly, a revoluble gear pin in position to engage the rack on said locking pin, a spring-held trip mounted eccentrically in said gear pin, a sliding rack bar the inner end of which when moved inwardly engages and actuates said trip for turning the gear pin and withdrawing the locking pin and from which said trip escapes before the limit of the inward movement of said rack bar has been completed, and a hand lever provided with a segmental gear for engaging said rack bar, the parts being so arranged that when said hand lever is moved in one direction it will cause the wit'\drawal of the locking pin and when moved farther in the same direction will cause the trip to escape from the end of the sliding rack bar and release the locking pin, and when the lever is moved in the opposite direction it will return the sliding rack bar to its normal position.

In witness whereof, I have hereunto affixed my signature in the presence of the witnesses herein named.

CHARLES L. LIBBY.

Witnesses:
OLIVE BREEDEN,
V. H. LOCKWOOD.